United States Patent
Rohrer

(10) Patent No.: US 8,604,631 B2
(45) Date of Patent: Dec. 10, 2013

(54) OCEAN WAVE ENERGY CONVERTER WITH MULTIPLE CAPTURE MODES

(75) Inventor: John W. Rohrer, York, ME (US)

(73) Assignee: Rohrer Technologies, Inc., York, ME (US)

( * ) Notice: Subject to any disclaimer, the term of this patent is extended or adjusted under 35 U.S.C. 154(b) by 53 days.

(21) Appl. No.: 13/199,607

(22) Filed: Sep. 2, 2011

(65) Prior Publication Data

US 2012/0032446 A1  Feb. 9, 2012

Related U.S. Application Data

(63) Continuation-in-part of application No. 12/454,984, filed on May 27, 2009, now abandoned, and a continuation-in-part of application No. 12/800,981, filed on May 27, 2010, which is a continuation-in-part of application No. 12/802,018, filed on May 27, 2010.

(51) Int. Cl.
  *F03B 13/10*  (2006.01)
(52) U.S. Cl.
  USPC ............................................. 290/42; 290/53
(58) Field of Classification Search
  USPC ........................................ 290/42, 53
  See application file for complete search history.

(56) References Cited

U.S. PATENT DOCUMENTS

| | | | |
|---|---|---|---|
| 3,307,827 A * | 3/1967 | Silvers et al. | 60/501 |
| 3,353,787 A | 11/1967 | Semo | 253/4 |
| 4,295,800 A | 10/1981 | Packer | |
| 4,359,868 A | 11/1982 | Slonim | |
| 4,375,151 A | 3/1983 | French | |
| 4,630,440 A | 12/1986 | Meyerand | 60/398 |
| 4,843,250 A | 6/1989 | Stupakis | |
| 5,329,497 A | 7/1994 | Previsic | 367/41 |
| 5,349,819 A | 9/1994 | Margittai | 60/398 |
| 5,405,250 A | 4/1995 | Vowles et al. | |
| 5,473,892 A | 12/1995 | Margittai | 60/398 |

(Continued)

FOREIGN PATENT DOCUMENTS

| | | | |
|---|---|---|---|
| WO | WO 97/37123 | 2/1997 | F03B 13/14 |
| WO | WO 01/06119 A1 | 1/2001 | F03B 13/18 |

(Continued)

OTHER PUBLICATIONS

Oct. 29-Nov. 11 "The Engineer" (pp. 26-27 entitled "New Wave"), enclosed.

(Continued)

*Primary Examiner* — Tho D Ta
(74) *Attorney, Agent, or Firm* — Mark D. Lorusso

(57) ABSTRACT

An ocean wave energy converter utilizes a substantially submerged elongated absorption barrier oriented parallel to oncoming wave fronts having one or more substantially submerged air or gas filled variable volume vessels located between a relatively fixed position rigid rearward surface and a moving rigid wave front facing surface. Said vessel(s) are compressed by oncoming overhead wave crests both by increased hydrostatic pressure and wave kinetic impact, thereby capturing both wave potential energy (hydrostatic or heave) and kinetic (impact or surge) energy. Vessel compression is resisted by hydraulic, pneumatic, mechanical or linear electric generation means. Vessel re-expansion, when wave troughs are overhead, utilize hydraulic, pneumatic, electric, and/or mechanical (gravity mass or spring) means. Wave energy capture is enhanced by venting vessel air or gas directly to and from atmosphere or low pressure surface expandable vessel(s), which venting may also drive pneumatic turbine-generators, and by oncoming wave shoaling and focusing means.

22 Claims, 10 Drawing Sheets

(56) References Cited

U.S. PATENT DOCUMENTS

| | | | |
|---|---|---|---|
| 5,909,060 A | 6/1999 | Gardner | 290/53 |
| 6,291,904 B1 | 9/2001 | Carroll | 290/53 |
| 6,392,314 B1 | 5/2002 | Dick | 290/53 |
| 6,457,307 B1 * | 10/2002 | Feldman et al. | 60/398 |
| 6,700,217 B1 | 3/2004 | North | 290/53 |
| 6,772,592 B2 | 8/2004 | Gerber | 60/495 |
| 6,833,631 B2 | 12/2004 | Van Breems | |
| 6,933,623 B2 | 8/2005 | Carroll | 290/42 |
| 7,391,127 B2 | 6/2008 | Ayntrazi | 290/53 |
| 2006/0090463 A1 | 5/2006 | Burns | 60/495 |
| 2006/0202483 A1 * | 9/2006 | Gonzalez | 290/53 |
| 2007/0253841 A1 | 11/2007 | Burns | 417/32 |
| 2008/0019847 A1 | 1/2008 | Burns et al. | |
| 2008/0050178 A1 | 2/2008 | Erlingsson | 405/21 |
| 2008/0146103 A1 | 6/2008 | Gerber | |
| 2009/0165454 A1 * | 7/2009 | Weinberg | 60/497 |
| 2010/0308589 A1 | 12/2010 | Rohrer | 290/53 |
| 2010/0308590 A1 | 12/2010 | Rohrer | |

FOREIGN PATENT DOCUMENTS

| | | |
|---|---|---|
| WO | WO 2010/078940 | 7/2010 |
| WO | WO 2011/062576 | 5/2011 |
| WO | WO 2011/067124 | 9/2011 |

OTHER PUBLICATIONS

*Ocean Wave Energy*, Joao Cruz, Ed., 2008 Springer, Chapter 2 Stephen Salter, pp. 30-31 re "sloped IPS buoy."

\* cited by examiner

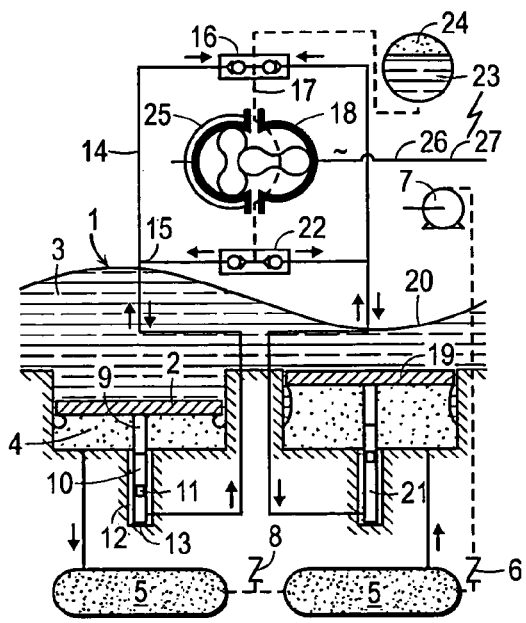
FIG. 1 (Prior Art)
VanDenBerg, A.P. WO/1997/037123
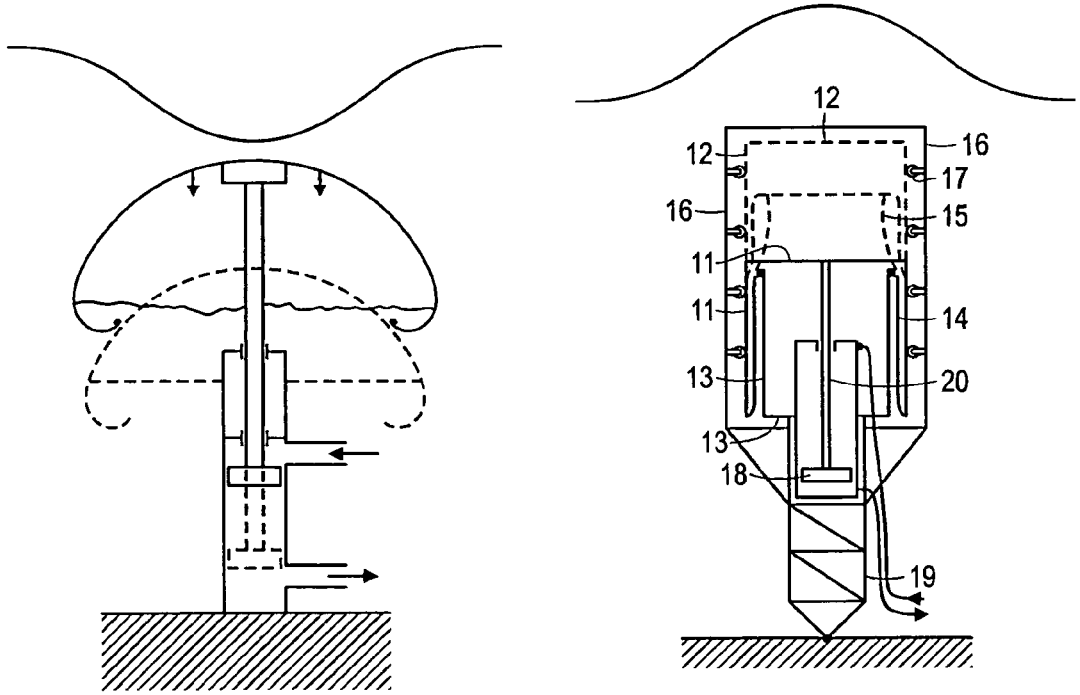
FIG. 2 (Prior Art)
AWS-Teamwork
Technick 1995-2004
FIG. 3 (Prior Art)
AWS Nov 2007

Burns US 2007/0253841 AI

Meyerand U.S. 4,630,440

Per Bellamy (1985) and AWS III

Per Bellamy (1985) and AWS III

OCEAN WAVE ENERGY CONVERTER WITH MULTIPLE CAPTURE MODES

RELATED U.S. APPLICATION DATA

Continuation-in-Part of U.S. applications Ser. No. 12/454,984 filed on May 27, 2009, Ser. No. 12/800,981 filed on May 27, 2010, and Ser. No. 12/802,018 filed on May 27, 2010.

FIELD OF INVENTION

This invention relates to devices for producing electrical power, pressurized water or other useful work from surface waves on a water body.

More particularly, this invention relates to wave energy converters wherein either all or a substantial portion of the energy captured or produced is from one or more substantially submerged devices relying on overhead wave induced subsurface differences in hydrostatic pressure and surge or pitch which expand and contract or otherwise deform or deflect one or more air or gas filled variable volume containers, thereby producing useful work with a pneumatic, hydraulic, mechanical or linear electric power take off means resisting such compression or expansion. Such expansion and contraction can be enhanced or supplemented by wave focusing, reflection or diffraction techniques and/or by surface floating bodies.

BACKGROUND OF THE INVENTION

Wave energy commercialization lags well behind wind energy despite the fact that water is approximately 800 times denser than air, and waves travel over thousands of miles for days and even weeks after the wind which originally produced them has subsided. Waves, therefore, efficiently store wind energy at much higher energy densities, typically averaging up to 50 to 100 kw/m of wave front in many northern latitudes.

Hundreds of uniquely different ocean wave energy converters (OWECs) have been proposed over the last century and are described in the patent and commercial literature. Less than a dozen OWEC designs are currently ocean deployed as "commercial proto-types." Virtually all of these initial designs suffer from high cost per average unit of energy capture. This is primarily due to the use of heavy steel construction necessary for severe sea-state survivability combined with (and in part causing) low wave energy capture efficiency. Only about 10% of currently proposed OWEC designs are deployed subsurface and/or can be submerged to greater depths where severe sea-state problems are substantially reduced. Most subsurface OWECs are, unfortunately, designed for near shore sea bed deployment. Ocean waves lose substantial energy as they approach shore (due to breaking or reflected waves and bottom hydrodynamic friction effects). Near shore submerged sea bed located OWECs must be deployed at greater depths relative to average wave trough depths due to severe sea-state considerations to avoid breaking wave turbulence, and depth can not be adjusted for the large tidal depth variations found at the higher latitudes where average annual wave heights are greatest. Wave induced subsurface hydrostatic pressure oscillations diminish more rapidly in shallow water as the depth below waves or swell troughs decreases.

Only a few prior art substantially or fully submerged ("subsurface") devices use gas filled variable volume or deformable containers like the present invention, producing container expansion or contraction in response to overhead swell and trough induced static pressure changes. Only one of the prior art subsurface OWECs attempts to capture both hydrostatic (heave) and hydrokinetic wave energy (surge or pitch), which represents half of all wave energy, per the present invention. None of the prior art gas filled deformable containers use surface direct or low pressure indirect venting or breathing of container gas to increase container deformation or stroke and, therefore, wave energy capture. None of these prior art subsurface OWECs enhance or supplement energy capture with overhead floating bodies. All of the prior subsurface deformable container OWECs suffer from high mass (and therefore cost) and low energy capture efficiency (even more cost) usually due to either near shore and/or sea bed deployment and high moving mass. None of these prior art subsurface devices have the tidal and sea-state depth adjustability of the present invention needed for enhanced energy capture efficiency and severe sea-state survivability. None of the prior art devices have the low moving mass (allowing both short wave length and long swell energy capture) and the large deformation stroke (relative to wave height) needed for high capture efficiency like the present invention.

At least two prior art devices use two variable volume gas filled containers, working in tandem, to drive a hydraulic turbine or motor. Gardner (U.S. Pat. No. 5,909,060) describes two sea bed deployed gas filled submerged inverted cup shaped open bottom containers laterally spaced at the expected average wavelength. The inverted cups are rigidly attached to each other at the tops by a duct. The cups rise and fall as overhead waves create static pressure differences, alternately increasing and decreasing the gas volume and hence buoyancy in each. The rise of one container and concurrent fall of the other (called an "Archemedes Wave Swing") is converted into hydraulic work by pumps driven by said swing.

Similarly, Van Den Berg (WO/1997/037123 and FIG. 1) uses two sea bed deployed submerged average wavelength spaced interconnected pistons, sealed to underlying gas filled cylinders by diaphragms. Submerged gas filled accumulators connected to each cylinder allow greater piston travel and hence work. The reciprocating pistons respond to overhead wave induced hydrostatic pressure differences producing pressurized hydraulic fluid flow for hydraulic turbines or motors.

The twin vessel Archemedes Wave Swing ("AWS") of Gardner (U.S. Pat. No. 5,909,060) later evolved into a single open bottomed vessel (FIG. 2) and then more recently Gardner's licensee, AWS Ocean Energy has disclosed an enclosed gas filled circular section vessel (an inverted rigid massive steel cup sliding over a second upright steel cup) under partial vacuum rather than the surface venting or breathing of the present invention to reduce stroke limiting gas compression (FIG. 3). Partial vacuum is maintained via an undisclosed proprietary "flexible rolling membrane seal" between the two concentric cups. Power is produced by a linear generator (FIG. 2 shown) or hydraulic pump driven by the rigid inverted moving upper cup. An elaborate external frame with rails and rollers, subject to fouling from ocean debris, is required to maintain concentricity and preserve the fragile membrane. No attempt is made to capture any wave kinetic energy (surge) which represents 50% of total wave energy in deep water (and even more in shallow water).

FIG. 4 (Burns U.S. 2008/0019847A1) shows a submerged sea bed mounted gas filled rigid cylindrical container with a rigid circular disc top connected by a small diaphragm seal. The disc top goes up and down in a very short stroke in response to overhead wave induced static pressure changes and drives a hydraulic pump via stroke reducing, force increasing actuation levers. Burns recognizes the stroke and efficiency limitations of using wave induced hydrostatic pressure variations to compress a gas in a submerged container and attempts to overcome same by arranging multiple gas interconnected containers perpendicular to oncoming wave fronts. North (U.S. Pat. No. 6,700,217) describes a similar device. Both are sea bed and near shore mounted and neither is surface vented like the present invention to increase stroke and, therefore, efficiency or makes any attempt to capture wave kinetic energy (surge). North, U.S. Pat. No. 6,700,217 describes a container and small diaphragm seal very similar to Burns and also without gas venting.

FIG. 5 (Meyerand U.S. Pat. No. 4,630,440) uses a pressurized gas filled device which expands and contracts an unreinforced bladder within a fixed volume sea bed deployed rigid container in response to overhead wave induced static pressure changes. Bladder expansion and contraction within the container displaces sea water through a container opening driving a hydraulic turbine as sea water enters and exits the container. Expansion and contraction of the submerged bladder is enhanced via an above surface (shore mounted) diaphragm or bellows. High gas pressure is required to reinflate the submerged bladder against hydrostatic pressure severely reducing submerged bladder deformation.

FIGS. 6a and 6b show Bellamy's Circular Coventry Clam (1985) which locates 12 semi-submerged air bags around a common circular air duct. Air is displaced from some bags into others by waves, the displaced air passing through Wells air turbines. Capture efficiency is highly dependent on wave length and period and only those bags facing oncoming waves have any kinetic (surge) energy capture effectiveness.

DISCLOSURE OF THE PRESENT INVENTION

According to embodiments of the present invention, the majority of the volume of one or more gas tight deformable containers are submerged below the mean water level. Said container(s) have a relatively fixed position rigid end or surface fixed by vertical buoyant (floating) columns, horizontal and/or vertical stabilization discs or drag plates, or rigid sea bed attached spars, masts, pilings or sea walls. A second movable rigid end or surface opposes said first fixed end or surface and is oriented towards oncoming wave fronts. Said fixed and movable rigid ends are separated and connected by and sealed to one or more air or gas filled, gas tight variable volume primary vessels or containers. Oncoming waves and troughs produce hydrostatic pressure variations and concurrent kinetic impact forces (surge forces) on said movable end which compress and assist in re-expansion of said containers, respectively, bringing said movable end closer to and further from said fixed end. Container expansion and contraction (or "stroke") is enhanced by venting of said container's gas to a surface atmospheric vent or to a secondary surface expandable bellows or bladder, or reservoir at or near atmospheric pressure. Without said atmospheric venting, said stroke and hence wave energy capture would be reduced several fold. The relative motion between said containers' fixed and movable ends, or the change in volume of said variable volume container is transferred to a power take off means which can be a hydraulic or pneumatic pumping means or, mechanical or electrical direct drive means. The pressurized fluid flow from said hydraulic or pneumatic pumping can drive a motor or turbine with electric generator. Mechanical means can direct drive a generator via rack and pinion gearing, oscillating helical drives or other oscillating linear one or two way rotational motion means. Electrical direct drive means can be by a linear generator. After compression, return and expansion of said container and its movable end can be assisted during wave trough periods by gravity (mass of movable end or weights attached to said ends, mechanical (i.e. springs), pneumatic (compressed gas), hydraulic or electric means. Wave energy capture efficiency can be enhanced by delaying or timing said compression and expansion until hydrostatic pressure and kinetic wave impact on said moving end is optimized via the use of pressure sensors and computer directed electric or pneumatic controls. Power recovery can occur on either or both compression or expansion strokes. The submerged depth of said containers relative to mean sea level can be hydrostatically sensed and adjusted by adjustable buoyancy floating vertical mounting columns (or by hydraulic or electro-mechanical drives if attached to sea bed fixed mounts) for tides or sea states to optimize wave energy capture efficiency. The submerged depth can also be increased or the device can be temporarily compressed or locked down during severe sea-states to increase survivability. The stroke or linear motion produced by said container's compression and expansion and applied to said pumping or drive means can be reduced and its drive force correspondingly increased by use of leveraged connecting means such as rack and pinion or reduction gears, scissor-jacks, linear helical drives, or lever and fulcrum actuators located either inside or outside said containers. High hydraulic pressure for hydraulic motor generators can be produced even in moderate sea states by the digital selective use of multiple drive cylinders or by using multi-stage telescoping cylinders. The linear oscillating motion of said container(s) expansion and contraction can be converted into smooth one way turbine, pump, motor or generator rotation via the use of known methods including variable volume hydraulic accumulator tanks, flow check (one way) valves and circuits or mechanical drives, ratchets and flywheels. Mechanically connecting said moving second surface to any surface floating device, including said floating vent buoy or another type of floating wave energy converter further increases stroke, energy capture and efficiency. Suitably shaping, inclining (towards wave fronts) and extending the surfaces of said moving second surface or placing a fixed inclined shoaling plane in front of said moving surface provides major additional energy capture. Wave focusing methods (such as use of vertical converging side walls on said shoaling plane or said moving surface) also increase both potential (heave) and kinetic (surge and pitch) wave energy capture. The subject device may have a typical stroke of 5 meters, a width of 20 meters, and produce 1 MW of electrical power. Elongated or multi-unit devices may have major dimensions and outputs of several times that.

DISTINGUISHING FEATURES OVER PRIOR ART

The subject invention provides substantial advantages over the prior art:

Distinguishing features over Van Den Berg (FIG. 1) and Gardiner (FIG. 2), AWS (FIG. 3), Burns (FIG. 4), North and Meyerand (FIG. 5) were previously discussed (in the Background of the Invention) and in Rohrer 2010/0308590A1 incorporated herein by reference. Neither Van Den Berg, Gardiner, AWS, Burns or Meyerand have any method for capturing any kinetic-surge wave energy comprising 50% of total wave energy in deep water.

Margittai (U.S. Pat. Nos. 5,349,819 and 5,473,892) describes a flexible gas (air) filled submerged (sea bed placed) container (bladder) which expands and contracts in response to overhead wave induced hydrostatic pressure changes. The rigid top surface is rigidly affixed to and drives a vertical open cycle water pump. Unlike the present invention, Margittai does not vent or evacuate his container (he actually "inflates" or pressurizes it like Meyerand to hold its shape against submerged hydrostatic pressure and to provide his only return or re-expansion means, thereby limiting his stroke and wave energy absorption several fold. Margittai uses a simple bladder unreinforced against external hydrostatic pressure, unlike certain embodiments of the present invention. Margittai relies upon severely stroke and efficiency limiting high internal air pressurization for his return means rather than the gravity, mechanical, pneumatic or hydraulic return means of the present invention.

FIGS. 6a and 6b show the "circular sea clam" of N. W. Bellamy of Coventry Polytechnic (1985). The circular sea dam is now being advanced by AWS Ocean Energy Ltd. as the AWS III. The device uses a series of 8 to 12 partially submerged air bags (without the rigid frontal hydrodynamic surface of the present invention) arranged in a circle around a common rigid floating air duct and base. Oncoming wave crests deflate the nearest bags displacing air through an air turbine and into the common duct and then through another air turbine re-inflating bags near a wave trough (also unlike the present invention). The entire 8-12 bag system is precharged to moderate pressure (unlike the atmospheric or low pressure venting of the present invention). Only those 3-4 bags (of 12) facing oncoming wave fronts capture any wave kinetic energy and performance is highly dependent on wave length and frequency, which varies greatly in actual random sea conditions. The bags are exposed to damage from floating objects and do not have the rigid hydrodynamically optimized forward rigid moving cover plate of the present invention. Only a minority of bags are capturing hydrostatic wave energy at any point in time. The device is limited to pneumatic (air) turbines for power take off, whereas the present invention can use any power take off means. The circular sea clam cannot submerge to survive severe sea states like the present invention leaving its fragile unprotected bags facing 15 meter winter storm waves.

BRIEF DESCRIPTION OF THE DRAWINGS

FIG. 1 is a submerged elevation sectional view of the Prior Art by Van Den Berg 1997/037123.

FIG. 2 is a submerged elevation sectional view of the Prior Art of Gardner U.S. Pat. No. 5,909,060.

FIG. 3 is a submerged elevation sectional view of the Prior Art of AWS Ltd. as described in the published 29 Oct.-11 Nov. 2007 "The Engineer" (pgs. 26 and 27).

FIGS. 7-14 are oriented with oncoming wave fronts proceeding from right to left.

FIG. 8 is a semi-submerged side elevation sectional view of an upwardly sloped embodiment of the present invention utilizing two air filled flexible bladders as said variable volume primary vessels.

FIG. 10 is a semi-submerged side elevation sectional view of a downwardly sloped embodiment of the present invention utilizing an internal rib reinforced flexible bellows as said air or gas filled primary variable volume vessel preceded by a fixed shoaling plane.

FIG. 11 is a partial sectional side elevation view per FIG. 10 with the addition of an upwardly extending wave impacting frontal surface and a bellows protective upper surface.

FIG. 12 is a semi-submerged side elevation sectional view of a downwardly sloped embodiment of the present invention utilizing a rib reinforced flexible bellows with a rigid moving front face preceded by and mechanically and pneumatically connected to a surface float with secondary venting expandable vessel.

FIG. 14 is a semi-submerged downward sloping isometric view of a downwardly sloping embodiment of the present invention utilizing an elongated rib reinforced flexible bellows, a fixed inclined wave shoaling plane preceding the rigid movable wave impacting end of said bellows, said bellows being attached to and vented through two vertically oriented bottom ballasted adjustable buoyancy floatation columns.

DESCRIPTION OF THE PREFERRED EMBODIMENTS

FIGS. 1-6 show prior art previously discussed and referenced. While most Figures of embodiments of the present invention show side elevational views which do not indicate the horizontal width (parallel to oncoming wave fronts) of the vessels of the subject invention, the width in preferred embodiments is elongated and exceeds vessel height and depth as is clearly shown in FIGS. 9b, 13b, and 14 of the present invention.

Figure 4:
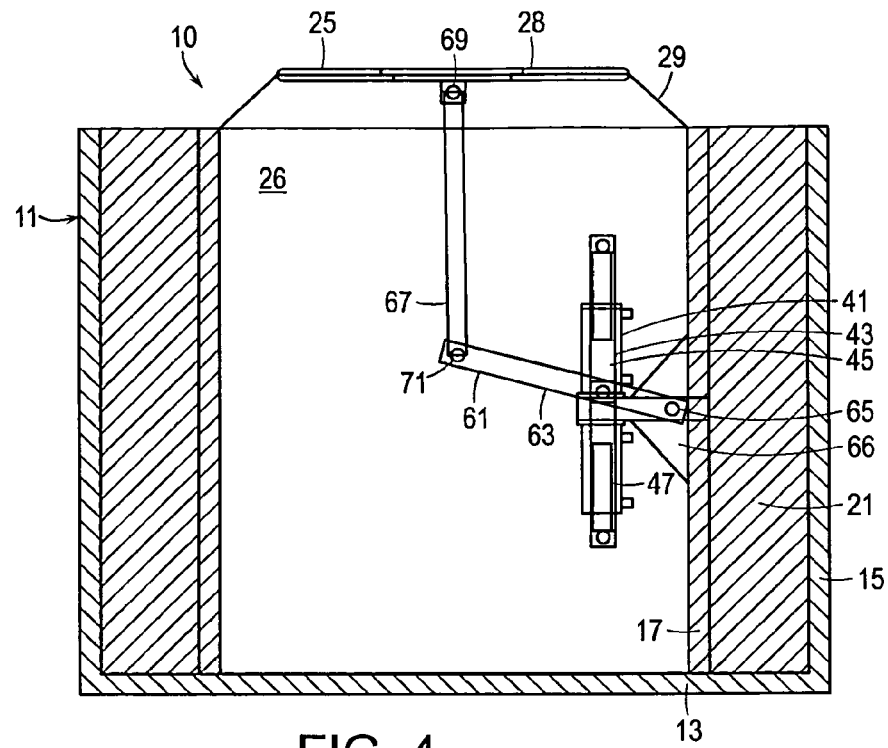
FIG. 4 is a submerged elevation sectional view of the Prior Art by Burns (2008/0019847A1).
Figure 5:
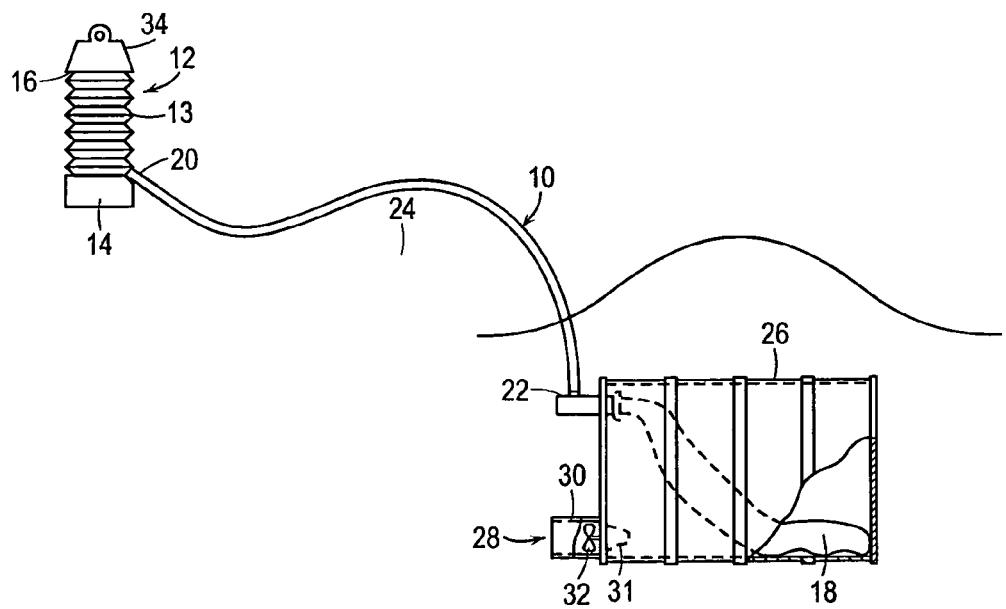
FIG. 5 is an elevation cutaway sectional view of Meyerand U.S. Pat. No. 4,630,440.
Figure 6A:
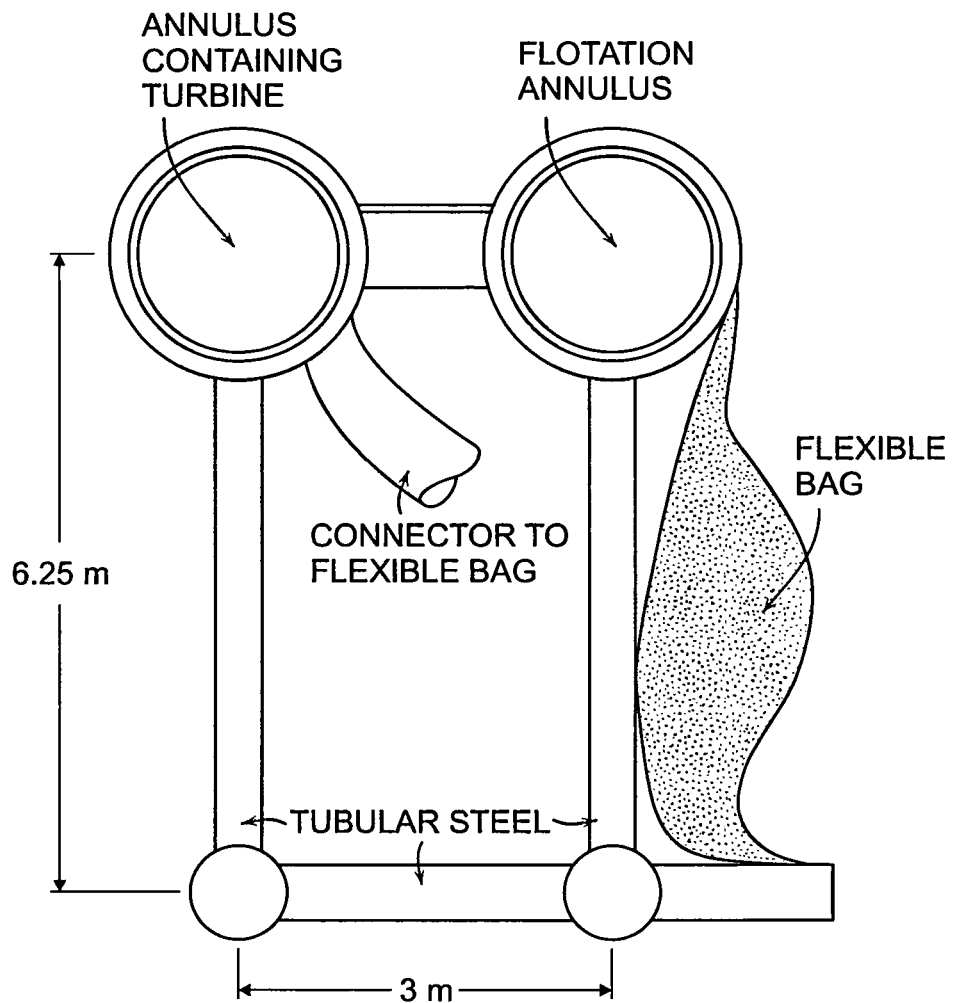
FIGS. 6a and 6b are semi-submerged elevation sectional and semi-submerged overhead views, respectively, of the Circular Coventry Clam of Bellamy (1985), now the AWS III.
Figure 6B:
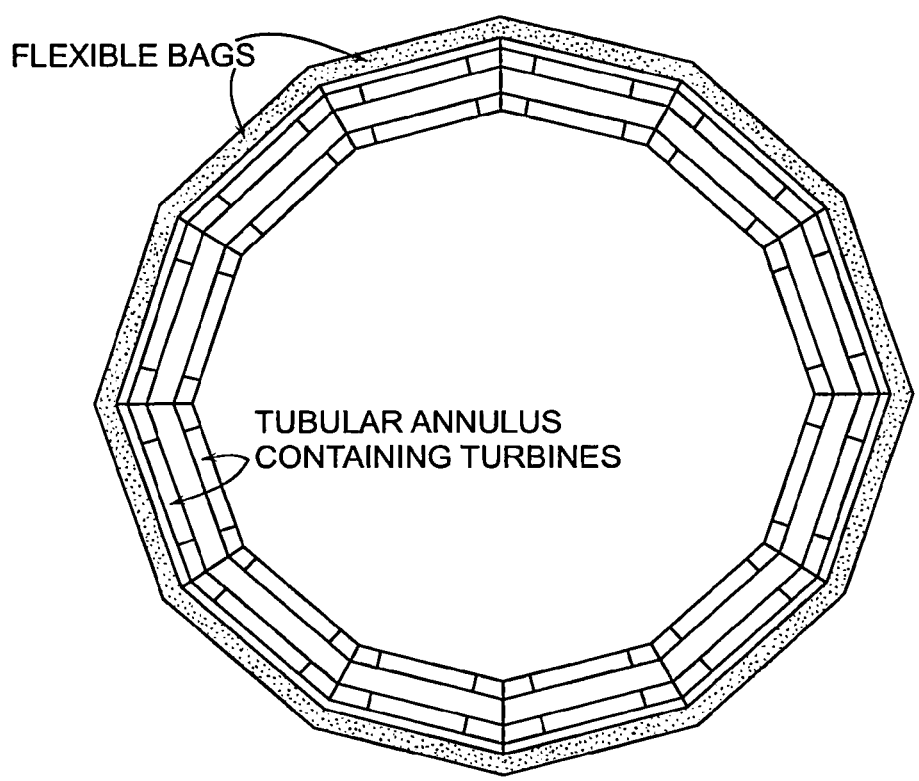
Figure 7:
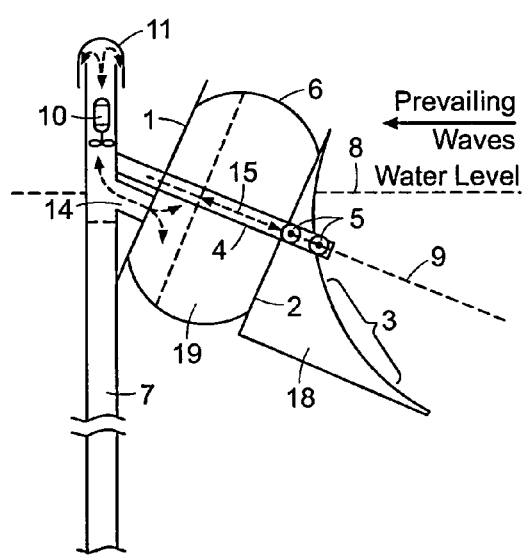
FIG. 7 is a semi-submerged side elevation sectional view of a downwardly sloped embodiment of the present invention utilizing an air filled flexible bladder as said variable volume primary vessel.

FIG. 7 shows an embodiment of the present invention with said first rearward fixed rigid surface 1 and said second movable surface 2 attached to or integral with a bladder 6 forming a substantially submerged (below mean water level 8) air filled container 19. Tracks 4 external to said bladder 6 restrict motion of movable surface 2 with tracking wheels 5 along said down sloping directional axis of movement 9 oriented towards the prevailing wave direction. Frontal hydrodynamic surface 3 is rigidly attached to movable surface 2 by bracket or housing 18 which can also house a water filled or other weighted compartment to assist bladder re-expansion. The full range of motion of movable surfaces 2 and 3 are indicated by 15. Said first surface 1 is maintained in a relatively fixed position via rigid attachment to two bottom ballasted (not shown) vertical floating hollow columns 7. Air filled vessel 19 is vented to and from atmosphere through ducts 14 in pneumatic and rigid mechanical communication with hollow columns 7 through two way or self rectifying air turbine-generator 10. Venting column cap 11 allows air flow to said variable volume vessel from atmosphere without allowing sea water intrusion.

Figure 8:
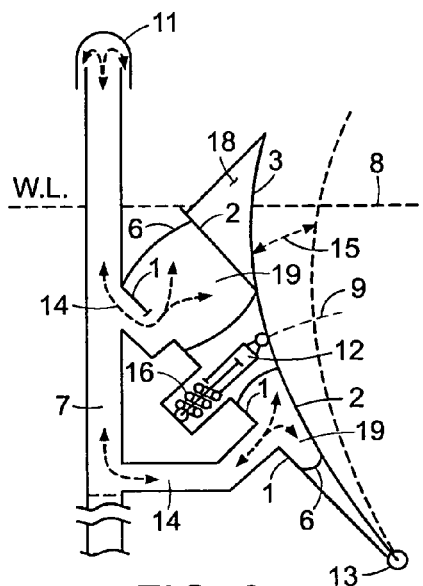

FIG. 8 shows an embodiment of the present invention with two substantially submerged air filled containers 19 attached to said first fixed surface 1 and said second movable surface 2 by gas tight bladders 6. Moving surface 2 also serves as hydrodynamically optimized wave impacting surface 3 and its motion relative to fixed surface 1 is determined via hinged joint 13. Direction and range of motion is indicated by 15. Surface 1 is maintained fixed, as in FIG. 7, by buoyant columns 7 which also provide a surface venting conduit through ducts 14 and column cap 11. Wave induced compression of vessels 19 is resisted by pneumatic or hydraulic cylinders 12 attached to both fixed first surface 1 and second movable surface 2. Return of surface 2 (and 3) is either by same cylinders 12 or via optional mechanical return springs 16.

Figure 9A:
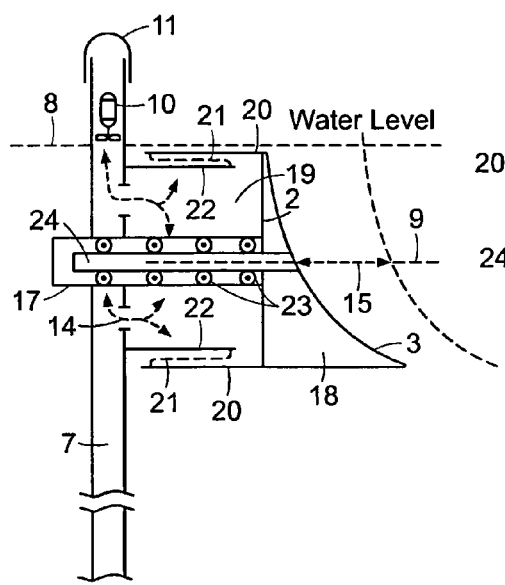
FIGS. 9a and 9b are semi-submerged side elevation sectional and frontal elevation views, respectively, of a horizontally oriented embodiment of the present invention utilizing a rigid moving rearwardly facing open container concentric over a relatively stationary frontwardly facing open container forming said variable volume gas filled primary variable volume vessel, with a flexible membrane seal keeping said container gas tight.
Figure 9B:
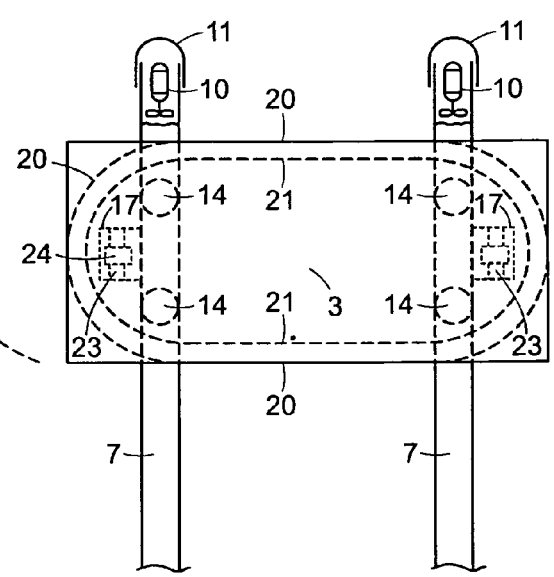

FIGS. 9a and 9b show side sectional and frontal elevation views, respectively, of an embodiment of the present invention similar to FIG. 7 with rearward surface 1 fixed via buoyant columns 7 and forward surface 2 attached to wave contacting surface 3 creating a substantially horizontal axis of movement as indicated by 15. Movement of surfaces 2 and 3 relative to surface 1 is maintained by track 24 rigidly attached to moving surface 2 and cage with rollers 23 attached to fixed surface 1, all within said gas tight vessel 19.

Rather than using the bladder 6 of FIG. 7, a gas tight vessel 19 is formed via a rearward extension 20 of moving surface 2 overlapping and concentric with a forward extension of fixed surface 1, with a membrane seal or diaphragm 21 between the ends of extensions 20 and 22 forming a gas tight variable volume vessel. As per FIG. 7, vessel 19 is vented through ducts 14 and columns 7 through air turbine-generator 10.

Figure 10:
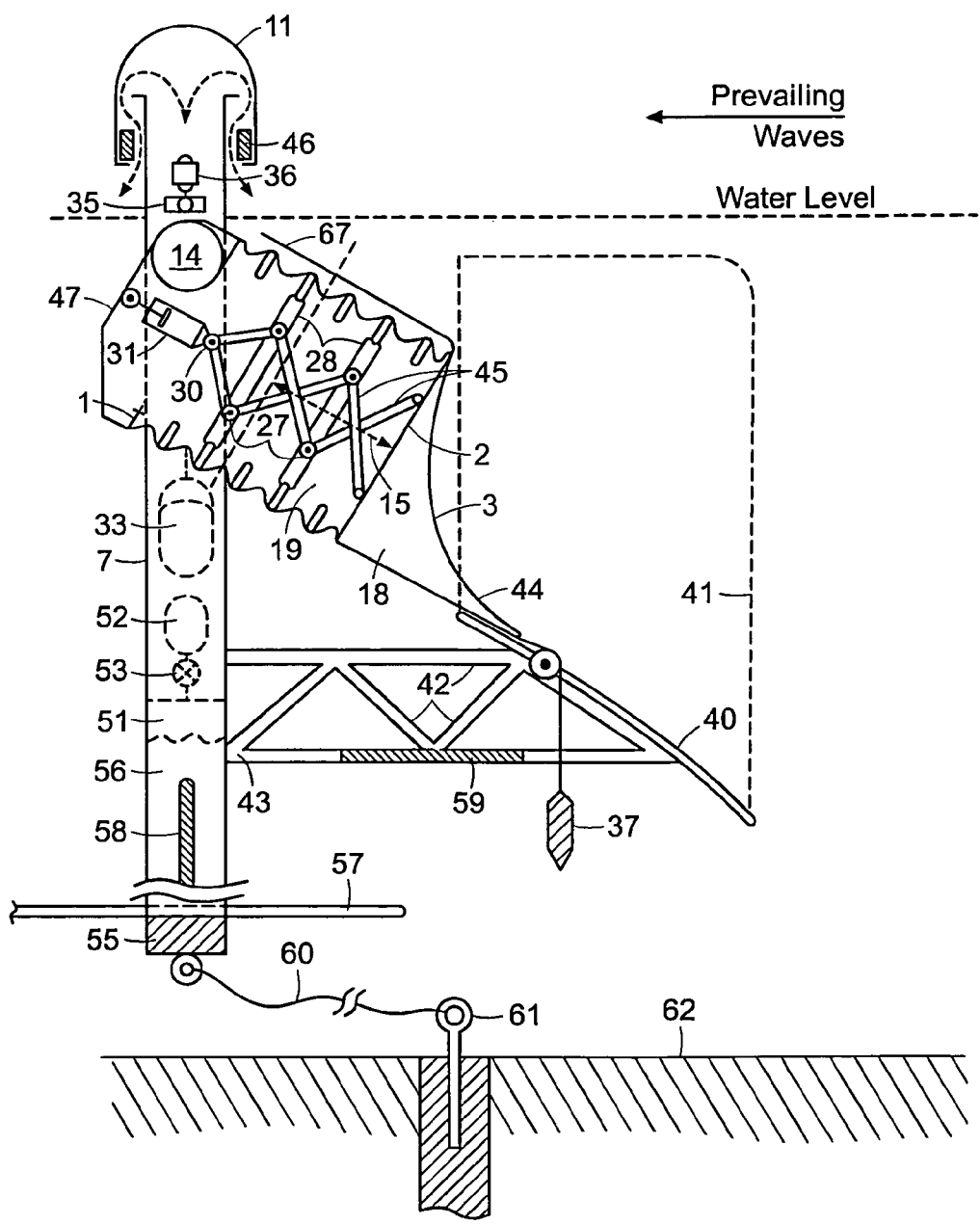

FIG. 10 shows an embodiment of the present invention wherein said first fixed surface 1 is connected to said second moving surface 2, with attached hydrodynamic enhancing surface 3 and affixed extension plate 44, via a flexible bellows 25 with internal reinforcing ribs 26, to resist collapse from lateral hydrostatic forces, forming said gas tight variable volume container 19 with a down sloping axis of movement 15. A plate or shield 67 protects the bellows from large floating objects. Rather than using the external (to container 19) roller tracks of FIG. 7 or the internal roller tracks of FIG. 9 to define the relative downward sloped motion 15 of moving surface 2 to fixed surface 1, an internal scissor jack 45 is used wherein hinge points have rollers 25 riding in tracks 28 connected to some (shown) or all (not shown) of said bellows internal reinforcing ribs 26. Said scissor jack 45 also reduces the stroke and correspondingly increases the force on hydraulic or pneumatic power take off cylinder 31 connected to said jack at point 30. A fixed rigid housing 47 conducts air venting to and from said variable volume container 19 through vent ducts 14 into and through the upper section of buoyant vertical columns 7 with vent cap 11 and water intrusion blocking float ring 46. Said vertical columns 7 also house a high pressure hydraulic or pneumatic accumulator tank 33 receiving high pressure fluid from cylinder 31 allowing a hydraulic or pneumatic motor or turbine 35 and generator 36 to produce grid ready synchronous power from a constant fluid flow from said high pressure accumulator tank 33. Alternatively, part or all of said hydraulic or pneumatic or other power take off system of one of several devices could be located in a common sea bed module (not shown). A sea bed bladder (not shown) could serve as a large capacity said accumulator for a compressed air storage system. Said hollow vertical columns 7 also contain a compressed air storage tank 52 with control valve 53. The lower portion of said columns contain variable volume sea water ballast chambers 51. The compressed air (responding to hydrostatic pressure sensors and a programmed controller) displaces water 50 in said chambers to raise or lower float columns 7 and attached said vessel, either to optimize energy capture or to survive extreme sea states.

Additional high density fixed ballasts 55 and a single or multi-point cable 60 and anchoring system 61 is attached to the lower portion of said columns 7 (shown) or to the shoal plane 40 (not shown). Horizontal 57 and/or vertical 58 drag planes or plates (along with surface 40 and ballasts 55) assist in keeping columns 7 and fixed rearward bellows surface 1 relative stationary. Alternatively, in more moderate water depths, the columns 7 can be affixed directly to the sea bed 62 or slide up and down one or more columns, poles, pillars or masts (not shown) fixed or rigidly embedded to the sea bed 62. A down sloping shoal plane 40 with optional converging side shields 41, acting like an artificial beach, focuses and funnels waves towards said variable volume vessel moving hydrodynamic wave impacting surface 3 and any moving extension plates 44 thereon. Said shoal plane 40 with any additional wave focusing features or attachments, increases wave height and slows wave velocity to further increase capture efficiency. Said shoal plane is kept in rigid communication with said fixed columns 7 via frame members 42 and 43. Said plane 40 also acts as a drag plane and frame 42 and 43 can hold additional drag plates 59. Return force (for vessel re-expansion) can be by hydraulic or pneumatic means, and/or can use gravity with compartment 18 between 2 and 3 storing solid or sea water ballast. Supplemental cable hung ballast weights 37 can also assist bellows re-expansion.

Figure 11:
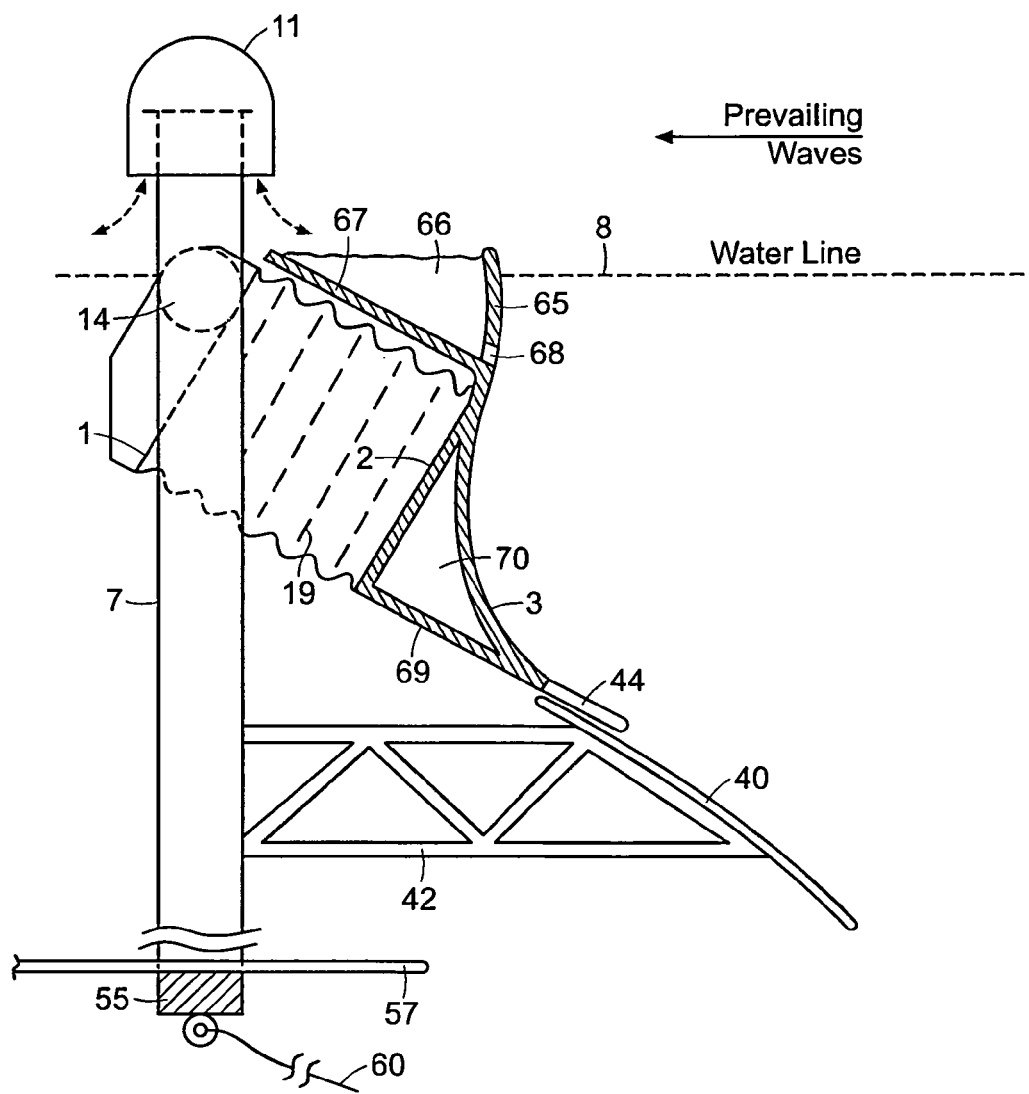

FIG. 11 shows an embodiment similar to FIG. 10 with air venting duct connection 14 between said variable volume container 19 and said vertical columns 7 above said bellows fixed surface 1. The void 70 volume between bellows moving forward surface 2 and hydrodynamic surface 3 with extension plate 44 can be filled with water or solid ballast to increase moving mass and reduce or eliminate other return means. The upward extension 65 of plate 3 and upper bellows protective plate 67 form a cavity 66 which fills with water from overtopping waves and drains out through hole 68 during smaller wave periods. This extra mass also provides added bellows re-expansion force during wave troughs.

Figure 12:
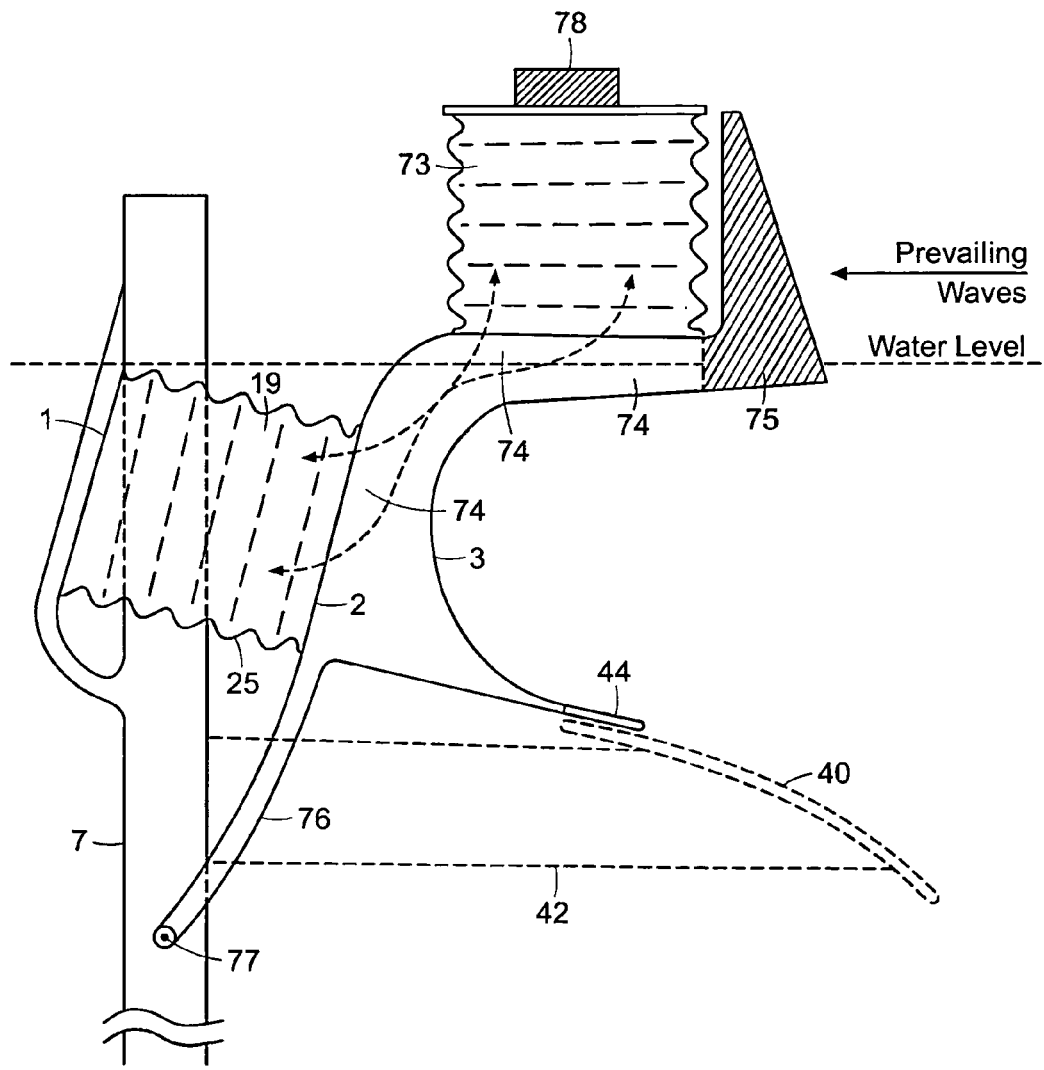

FIG. 12 shows an embodiment of the present invention wherein air or gas from said variable volume container 25 is vented to a secondary expandable surface container 73 rather than floatation columns 7 through duct 74 behind said wave impacting surface 3 with attached optional extension plate 44. An optional supplemental weight 78 provides a pneumatic return force to re-expand said primary vessel 19 during wave troughs. The buoyancy of said duct 74 and secondary expandable container 73 together with any supplemental floatation 75 provides an added compressive force on said primary variable volume container 25 as oncoming waves lift this buoyant body. The weight of said buoyant duct 74, said secondary venting vessel 73, and supplemental flotation 75, together with optional weight 78 also provide a return force to re-expand said primary vessel 19 during wave troughs. Rather than use the external rails 4 of FIG. 7 or the internal tracks 24 of FIG. 9, or the scissor jacks 45 of FIG. 10, lever arms 76 pivot around points 77 on or affixed to buoyant vertical columns 7. A downwardly sloped shoal plane (dotted lines 40) as previously described in FIGS. 10 and 11 can also be utilized to increase wave height and energy capture.

Figure 13A:
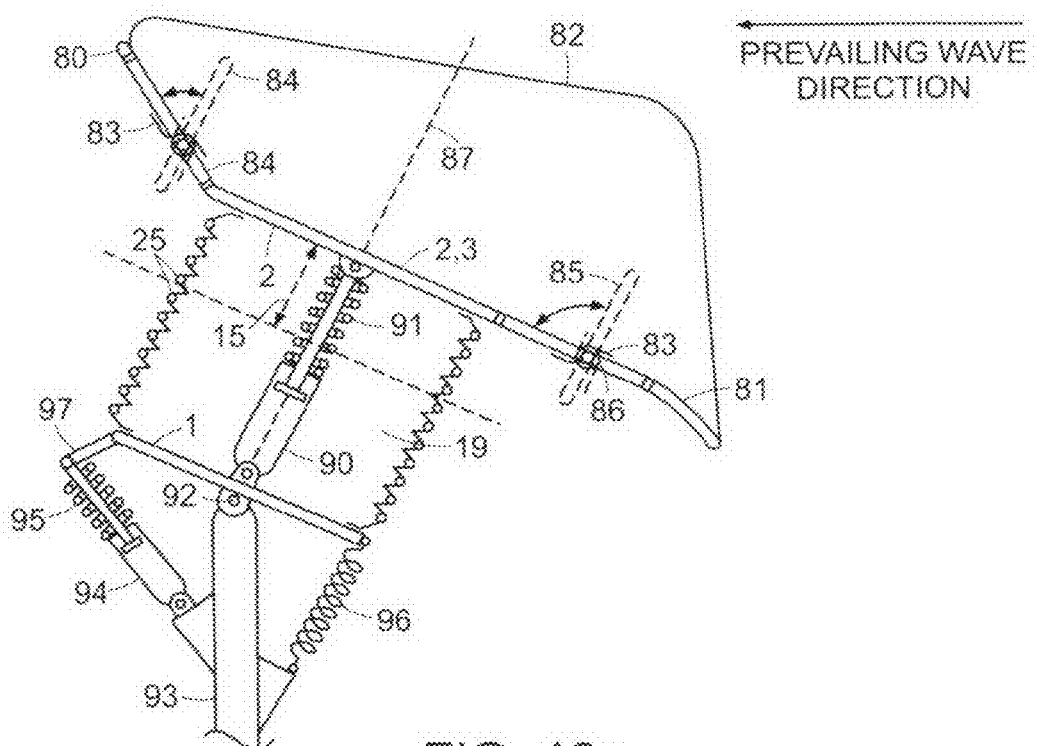
FIGS. 13a and 13b are semi-submerged side elevation sectional and overhead plan views, respectfully, of an upwardly sloped embodiment of the present invention utilizing a rib reinforced flexible bellows and an extended rigid bellows top moving surface incorporating wave focusing means.
Figure 13B:
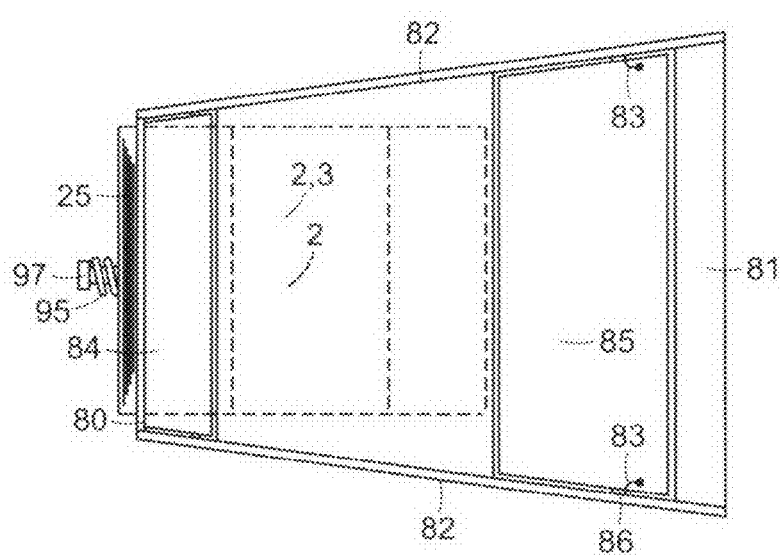

FIGS. 13a and 13b show an embodiment of the present invention wherein an upward sloping variable volume container 19 has an upward 80 and downward 81 extension of forward moving surface 2 which is also the moving hydrodynamic surface 3. Converging vertical side plates 82 either planar (shown) or contoured/parabolic (not shown) may also be utilized for added wave focusing and increase wave height. Spring 83 loaded panels 84 and 85 in said upper 80 and lower 81 extensions of moving surface 3 pivot closed about hinges 86 when wave crests are overhead and impacting said moving surface (3 plus 80 and 81). When said variable volume container 19 re-expands during wave troughs, said panels 84 and 85 open to reduce the hydrodynamic drag of surface extensions 80 and 81. The primary axis of movement of moving surface 3 (with 80 and 81) is along dotted line 87 driving high pressure hydraulic or pneumatic cylinder 90 up to maximum stroke 15 with high pressure fluid going to an onboard or remote power generating system. Said primary axis of movement 87 can be up sloping (shown), horizontal (per FIG. 9) or down sloping (per FIGS. 7, 10-11 and 12). Said moving surface 3 can be returned to re-expand container 19 via return springs 91 or by hydraulic or pneumatic means (not shown). Said variable volume container 19 interior can be partially evacuated (shown) or vented (per prior embodiments). In addition to said primary axis of movement along 87, said variable volume container 19 also rotates about hinge point 92 on position fixing mast 93 or buoyant columns (as previously described), compressing fluid in secondary high pressure hydraulic or pneumatic cylinder 94 with return springs 95 attached to extension of surface 1 and 96.

Figure 14:
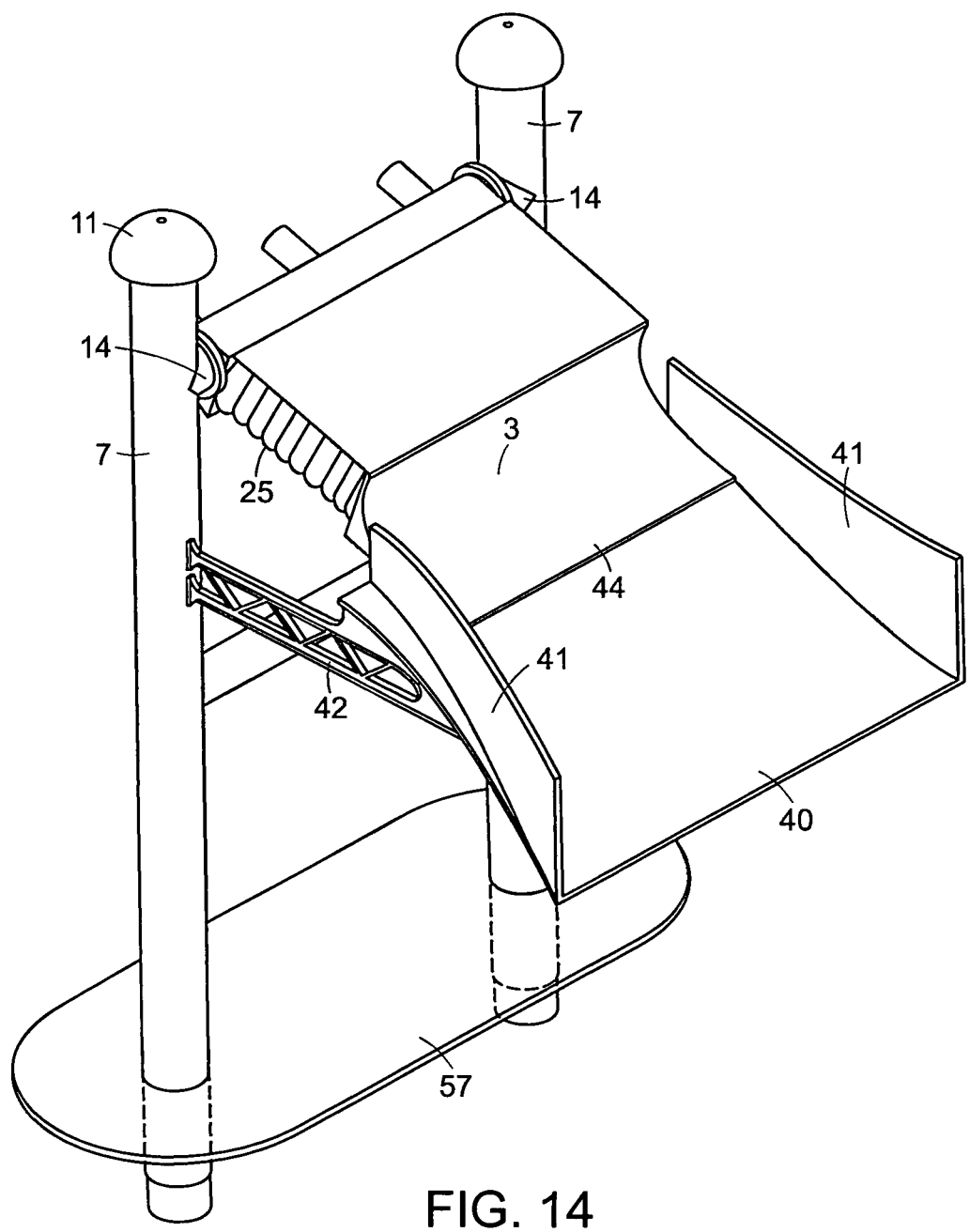

FIG. 14 is an isometric view of the FIG. 10 embodiment of the present invention with optional shoal plane converging vertical surface 41 and moving hydrodynamic surface 3 with extension 44, but without supplemental return weights 37, and drag or stabilization plates or planes 58 and 59.

The enclosed embodiments are provided to illustrate the broad inventive principles of the subject invention and are not intended to limit the invention to the details illustrated. Rather the claims are also meant to cover common or obvious modifications not illustrated, but still within the spirit of the present invention.

I claim:

1. A wave energy converting device comprising:
   at least one air or gas filled, substantially gastight variable volume primary container configured and oriented to be substantially submerged below a mean water level and to receive wave fronts at least partially horizontally from a wave front receiving end, wherein the horizontal direction is defined as the direction in which wave fronts are travelling, wherein the container is selected from the group consisting of substantially gas-tight flexible bladders, bags, diaphragms, bellows and combinations thereof;
   a rearward substantially rigid substantially fixed surface oriented distal from the wave front receiving end, integral to or secured to the at least one primary container;
   a forward substantially rigid movable surface oriented proximal to the wave front receiving end, integral to or secured to the primary container, wherein the container is positioned between the rearward surface and the forward surface, and wherein the container is configured to be compressed by the weight and increased hydrostatic pressure of wave crests above and surrounding the container and by the kinetic energy and velocity pressure of waves impacting the substantially rigid forward movable surface, wherein the container compresses and expands along an axis of movement wherein the axis of movement is inclined toward the oncoming wave fronts and wherein the incline orientation is selected from the group consisting of sloped downward, sloped upward, horizontal and combinations thereof relative to the direction of wave reception;
   a vent secured to the primary container, wherein the vent is configured to permit direct or indirect gaseous communication with atmospheric air;
   a device support and stabilization structure secured at least to the substantially rigid substantially fixed surface; and,
   a power take-off apparatus secured between the rearward surface or device support structure and the forward surface and configured to receive a least one force generated by compression or expansion of the at least one primary container and to convert the at least one force into either a direct or indirect pressurized fluid flow or to drive a generator.

2. The device of claim 1 wherein the device support structure comprises a frame including segments selected from the group consisting of ballast, drag planes, drag plates and combinations thereof.

3. The device of claim 1 further comprising a device anchor secured to the device support structure, wherein the device anchor is selected from the group consisting of sea-bed affixed masts, poles and pilings, the sea bed, seabed affixed anchor lines, off-shore towers, off-shore platforms, seawalls, breakwaters, shorelines and combinations thereof, wherein the device anchor is secured to the device support structure.

4. The device of claim 1 wherein the combined horizontal width of the forward movable surface is greater than the vertical height of the forward movable surface.

5. The device of claim 1 further comprising gravitational weights secured, directly or indirectly, to the forward movable surface.

6. The device of claim 1 further comprising a track or hinge system secured to the rearward surface and the forward surface to control the movement of the forward surface along the axis of movement.

7. The device of claim 1 wherein the forward movable surface further comprises at least one extension secured to an end of the forward movable surface.

8. The device of claim 1 further comprising a surface flotation device secured to the forward movable surface wherein the flotation device is selected from the group consisting of fixed volume floats, variable volume floats, open-top vessels, surface wave energy converters, surface vent buoys, a second variable volume container and combinations thereof.

9. The device of claim 1 further comprising a hydrostatic pressure sensor and a controller to control movement of the forward movable surface and to control the power take-off device.

10. The device of claim 1 wherein the device further comprises a container re-expansion element attached, directly or indirectly, to the at least one primary container and configured to re-expand the at least one primary container after a compression event, wherein the re-expansion element is selected from the group consisting of hydraulic cylinders, motors, the second container, gravitational weights, springs and combinations thereof.

11. The device of claim 1 wherein the power take-off device is selected from the group consisting of hydraulic motor generators, hydraulic cylinders, pumps, pneumatic turbine generators, mechanically driven generators, linear generators and combinations thereof.

12. The device of claim 11 wherein the device further comprises a container re-expansion system attached, directly or indirectly, to at least one of the rearward and forward surfaces and configured to re-expand the at least one primary container after a compression event, wherein the re-expansion system is selected from the group consisting of hydraulic cylinders, motors, the second container, gravitational weights, springs and combinations thereof.

13. The device of claim 1 further comprising an affixed extension plate secured to the forward movable surface.

14. The device of claim 13 further comprising a downwardly inclined wave shoaling surface secured to the device support structure.

15. The device of claim 14 further comprising substantially vertically oriented converging wave focusing side shields secured to the wave shoaling surface.

16. The device of claim 14 further comprising substantially vertically oriented converging wave focusing side shields, wherein the wave shoaling surface and the wave side shields are secured to the device support structure.

17. The device of claim 1 further comprising a second substantially gas-tight variable volume container secured to the vent and in gaseous communication with the vent and the at least one primary container, wherein the second container is configured to permit venting of the at least one primary container.

18. The device of claim 17 further comprising a gravitational weight secured to the top of the secondary container.

19. A wave energy converting device comprising:
at least one air or gas filled, substantially gas-tight variable volume primary container configured and oriented to be at least partially submerged in water and to receive wave fronts from a wave front receiving end, wherein the container is selected from the group consisting of substantially gas-tight flexible bladders, bags, diaphragms, bellows and combinations thereof;
a rearward substantially rigid substantially fixed surface oriented distal from the wave front receiving end, integral to or secured to the at least one primary container;
a forward substantial ridge movable surface oriented proximal to the wave front receiving end, integral to or secured to the primary container, wherein the container is positioned between the rearward surface and the forward surface, and wherein the container is configured to be compressed by the weight and increased hydrostatic pressure of wave crests above and surrounding the container and by the kinetic energy and velocity pressure of waves impacting the substantially rigid forward movable surface, wherein the container compresses and expands along an axis of movement wherein the axis of movement orientation is selected from the group consisting of downward, upward and horizontal relative to the direction of wave reception;
a vent secured to the primary container, wherein the vent is configured to permit direct or indirect gaseous communication with atmospheric air;
a device support and stabilization structure secured at least to the substantially rigid substantially fixed surface, wherein the device support structure comprises at least one elongated, at least partially hollow floating column having a first portion configured to extend above wave crests when in a body of water and defining a chamber in pneumatic communication with the at least one container, and having a second portion configured to be at least partially submerged when in a body of water, wherein the second portion is oriented to be at least partially below the at least one container, and has a center of gravity oriented substantially below the center of gravity and center of buoyancy of the at least one container, and wherein the at least one column further defines a vent opening in pneumatic communication with the chamber, the at least one container, and the atmosphere; and,
a power take-off apparatus secured between the rearward surface or device support structure and the forward surface and configured to receive a least one force generated by compression or expansion of the at least one primary container and to convert the at least one force into either a direct or indirect pressurized fluid flow or to drive a generator.

20. A wave energy converting device comprising:
at least one air or gas filled, substantially gas-tight variable volume primary container configured and oriented to be at least partially submerged in water and to receive wave fronts from a wave front receiving end, wherein the container is selected from the group consisting of substantially gas-tight flexible bladders, bags, diaphragms, bellows and combinations thereof;
a rearward substantially rigid substantially fixed surface oriented distal from the wave front receiving end, integral to or secured to the at least one primary container;
a forward substantially rigid movable surface oriented proximal to the wave front receiving end, integral to or secured to the primary container, wherein the container is positioned between the rearward surface and the forward surface, and wherein the container is configured to be compressed by the weight and increased hydrostatic pressure of wave crests above and surrounding the container and by the kinetic energy and velocity pressure of waves impacting the substantially rigid forward movable surface, wherein the container compresses and expands along an axis of movement wherein the axis of movement orientation is selected from the group consisting of downward, upward and horizontal relative to the direction of wave reception;
a vent secured to the primary container, wherein the vent is configured to permit direct or indirect gaseous communication with atmospheric air;
a device support and stabilization structure secured at least to the substantially rigid substantially fixed surface, wherein the device support structure comprises at least one elongated, at least partially hollow floating column having a first portion configured to extend above wave crests when in a body of water, and having a second portion configured to be submerged when in a body of water, wherein the second portion is oriented to be at least partially below the at least one container, and has a center of gravity oriented substantially below the center of gravity and center of buoyancy of the at least one container, and wherein the second portion defines a chamber in pneumatic communication with the at least one container, wherein the at least one column further defines a vent opening in pneumatic communication with the chamber, the at least one container, and the atmosphere;
a device anchor secured to the device support structure, wherein the device anchor selected from the group consisting of sea-bed affixed masts, poles and pilings, the sea bed, seabed affixed anchor lines, off-shore towers, off-shore platforms, seawalls, breakwaters, shorelines and combinations thereof, wherein the device anchor is secured to the device support structure; and,
a power take-off apparatus secured between the rearward surface or device support structure and the forward surface and configured to receive a least one force generated by compression or expansion of the at least one primary container and to convert the at least one force into either a direct or indirect pressurized fluid flow or to drive a generator.

21. The device of claim 20 wherein the at least one column further comprises a compressed air displaceable variable volume water ballast to control the depth of the at least one primary container when placed in a body of water.

22. The device of claim 20 wherein the at least one column houses a power generator selected from the group consisting of hydraulic, pneumatic, mechanical and combinations thereof.

* * * * *